United States Patent
Cattaneo

(10) Patent No.: US 7,542,486 B2
(45) Date of Patent: Jun. 2, 2009

(54) METHOD OF PROCESSING AN INCIDENT PULSED UWB SIGNAL RECEIVED BY AN INDEPENDENT DATA DEVICE OF A WIRELESS DATA COMMUNICATION SYSTEM OF THE WPAN TYPE, AND CORRESPONDING INDEPENDENT DATA DEVICE

(75) Inventor: Chiara Cattaneo, St. Genis-Pouilly (FR)

(73) Assignee: STMicroelectronics N.V., Amsterdam (NL)

( * ) Notice: Subject to any disclaimer, the term of this patent is extended or adjusted under 35 U.S.C. 154(b) by 1105 days.

(21) Appl. No.: 10/792,032

(22) Filed: Mar. 3, 2004

(65) Prior Publication Data

US 2004/0218581 A1 Nov. 4, 2004

(30) Foreign Application Priority Data

Mar. 3, 2003 (EP) .................... 03290502

(51) Int. Cl.
*H04J 3/06* (2006.01)
*H04J 3/16* (2006.01)
*H04W 4/00* (2006.01)
*H04L 7/00* (2006.01)
*H03D 1/00* (2006.01)
*H03K 9/00* (2006.01)

(52) U.S. Cl. ............... 370/510; 370/471; 370/328; 375/354; 375/340; 375/316; 709/208

(58) Field of Classification Search ........... 370/503, 370/328, 329, 338, 350, 509, 510, 512, 321, 370/347, 468, 442, 471, 473; 455/574, 343.5, 455/444, 426.1, 426.2; 375/354, 340, 316, 375/343

See application file for complete search history.

(56) References Cited

U.S. PATENT DOCUMENTS

| | | | | |
|---|---|---|---|---|
| 4,005,266 A | * | 1/1977 | Lehr et al. | 375/356 |
| 5,832,035 A | | 11/1998 | Fullerton | 375/210 |
| 6,970,448 B1 | * | 11/2005 | Sparrell et al. | 370/347 |
| 7,054,349 B2 | * | 5/2006 | Cattaneo et al. | 375/130 |
| 7,088,782 B2 | * | 8/2006 | Mody et al. | 375/260 |
| 7,133,479 B2 | * | 11/2006 | Lee | 375/354 |
| 7,233,625 B2 | * | 6/2007 | Ma et al. | 375/260 |
| 7,254,202 B2 | * | 8/2007 | Cattaneo et al. | 375/354 |
| 7,257,182 B1 | * | 8/2007 | Elliott et al. | 375/365 |
| 7,339,883 B2 | * | 3/2008 | Santhoff et al. | 370/203 |

FOREIGN PATENT DOCUMENTS

WO 01/99300 12/2001

* cited by examiner

*Primary Examiner*—Hanh Nguyen
(74) *Attorney, Agent, or Firm*—Lisa K. Jorgenson; Allen, Dyer, Doppelt, Milbrath & Gilchrist, P.A.

(57) ABSTRACT

A method for processing an incident pulsed signal of an ultra wide band type received over a channel by a data device operating in a wireless data communications system is provided. The incident pulsed signal carries information within a super-frame structure. Upon reception of each super-frame structure by a data device, coarse synchronization is performed with another data device acting as a coordinator device for the wireless data communications system. The coarse synchronization uses a first training sequence. Upon reception of each frame allocated to the data device operating within the super-frame structure, channel estimation is performed using a second training sequence. The channel estimation also performs a frame synchronization.

36 Claims, 4 Drawing Sheets

METHOD OF PROCESSING AN INCIDENT PULSED UWB SIGNAL RECEIVED BY AN INDEPENDENT DATA DEVICE OF A WIRELESS DATA COMMUNICATION SYSTEM OF THE WPAN TYPE, AND CORRESPONDING INDEPENDENT DATA DEVICE

FIELD OF THE INVENTION

The present invention relates to the field of communications, and more particularly, to ultra wide band (UWB) radio technology. The present invention may be applied to wireless personal area networks, for example.

BACKGROUND OF THE INVENTION

Wireless personal area networks convey information over a relatively short distance among a relatively few participants. An example of a wireless personal area network is called a piconet. A piconet is a wireless data communications system that allows a number of independent data devices to communicate with each other. A piconet is distinguished from other types of data networks in that communications are normally confined to a person or object that typically covers about 10 meters in all directions, and envelops the person or a object whether stationary or in motion.

Ultra wide band radio technology departs from conventional narrow band radio and spread-spectrum technologies in that the bandwidth of the signal at −10 dB is typically greater than 20% of the center frequency. Instead of transmitting a continuous carrier wave modulated with information or with information combined with a spread code, which determines the bandwidth of the signal, a UWB radio transmits a series of very narrow impulses. For example, these impulses can take the form of a single cycle, or monocycle, having pulse widths less than 1 ns. These short time-domain impulses transformed into the frequency domain results in the ultra wide band spectrum of UWB radio technology.

In UWB radio technology, the information conveyed on the signal can be coded by pulse position modulation (PPM). In other words, information coding is performed by altering the timing of the individual pulses. More precisely, the series of impulses is transmitted at a repetition rate of up to several megahertz. Each pulse is transmitted within a window having a predetermined length (pulse repetition period), for example 50 ns. With respect to a nominal position, the pulse is in an early position or in a late position, which permits encoding of a 0 or a 1. It is also possible to encode more than two values by using more than two positions shifted with respect to the nominal position. It is also possible to superimpose a modulation of the BPSK type on this pulse position modulation.

The IEEE 802.15.3 MAC standard defines the wireless medium access control specifications for high rate wireless personal area networks (WPAN) using narrow band radio technology. However, up to now, no document defines the specification of a wireless data communication system, for example, a wireless personal area network using UWB radio technology. More particularly, no document defines the fine synchronization between two independent data devices of such a network communicating with each other within allocated frames of a super-frames structure.

SUMMARY OF THE INVENTION

In view of the foregoing background, an object of the present invention is to provide fine synchronization between two independent data devices communicating with each other within a wireless personal area networks (WPAN).

This and other objects, advantages and features in accordance with the present invention are provided by a method for processing an incident pulsed signal of the ultra wide band type, received from a channel by an independent data device of a wireless data communication system, and in particular, a wireless personal area network type of the piconet type. The incident signal carries information within a super-frame structure, with each super-frame structure includes several frames respectively allocated to communications between specific pairs of independent data devices of the system, and a header (also called a beacon) containing at least a first training sequence. Each frame includes a preamble containing at least a second training sequence.

The method may comprises upon reception of each super-frame structure, a step of cell synchronization including a coarse synchronization with another independent data device acting as a coordinator device of the system. The coarse synchronization uses the first training sequence. Upon reception of each frame allocated to the independent data device within the super-frame structure, a step of channel estimation is performed using the second training sequence. The channel estimation is based on at least one signal slice having ends temporally defined with respect to the result of the coarse synchronization for recovering all the channel energy. The step of channel estimation also performs simultaneously frame synchronization.

Although two devices are synchronized to the coordinator at the end of the cell synchronization step, they must be also synchronized to each other at the frame level. Between synchronization with the coordinator and the beginning of a frame allocated to an independent device, a relatively large amount of time may have passed and the independent devices may have evolved (e.g., movement of the independent devices within the environment). Furthermore, the two independent data devices may not know their relative position, and thus the propagation time between the two devices may be unknown prior to the beginning of the frame allocated to their communication.

According to the present invention, this necessary frame synchronization is performed at the frame level, simultaneously with the channel estimation, by using a same training sequence. In other words, the second training sequence is used for performing both channel estimation and frame synchronization. Thus, because the channel estimation algorithm performs also a frame synchronization, it is not necessary to perform a specific synchronization algorithm at the beginning of each frame. In other words, the channel estimation algorithm is a joined algorithm for frame synchronization and channel estimation.

According to an embodiment of the invention, the channel has a predetermined maximum length and the beacon further contains a time of arrival indication for each frame, and the coarse synchronization delivers a first delay information corresponding to the delay between the received incident signal and the transmitted signal. The channel estimation begins on a signal slice starting at an instant equal to the time of arrival of the frame increased with the difference between the first delay information and a predetermined offset. The signal slice may have a size equal to the maximum channel length increased with the predetermined offset.

The first delay information corresponds to the position of a peak detected during the coarse synchronization. Nevertheless, it is possible that this detected peak is not the first peak of the received channel response. Thus, when the channel is a multipath channel, the predetermined offset preferably comprises a first offset taking into account the fact that the first delay information is associated with a path of the channel that can be different from the first path. Statistical results show that the value of this first offset is around 10 ns, for example. This means that the position of the detected peak during the coarse synchronization is always within the first 10 ns of the channel response.

Another effect can lead to adjusting the position and the length of the signal slice. This second effect is the propagation delay. More precisely, during the coarse synchronization, all devices perform the synchronization with the coordinator device, which is the device sending the beacon. However, each frame is dedicated to communications between a specific pair of devices, and the propagation delay between these two devices is normally different from the delay propagation between the coordinator and the considered devices.

It has been observed that the maximum difference between the propagation delays depends on the maximum distance between devices. For example, a one meter distance corresponds to 3 ns of propagation delay. In a WPAN UWB system, the maximum distance considered is 10 meters, for example, so that the second offset of the predetermined offset can be set to about 30 ns. This takes into account the differences between the propagation delays between the coordinator and an independent data device, and between a pair of independent data devices. Generally, the predetermined offset can be the sum of the first and second offsets. Further, the first training sequence and the second training sequence may be different or identical.

Although the coarse synchronization and the step of channel estimation can be performed by several ways, for example, by using an analog maximum likelihood correlation, the coarse synchronization and the channel estimation advantageously comprise digital correlation, such as digital sliding correlation, for example.

More precisely, according to a preferred embodiment, the second training sequence is a dedicated pulsed train having a pulse repetition period, and the correlation step performed during the channel estimation step comprises coherent integration of successive signal slices having the same size and which are mutually temporally shifted with the pulse repetition period.

The present invention also provides an independent data device of a wireless data communications system, for example of the WPAN type, comprising reception means for receiving an incident pulsed signal of the ultra wide band type from a channel, with the incident pulsed signal carrying information within a super-frame structure. Each super-frame structure includes several frames respectively allocated to communications between specific pairs of independent data devices of the system, and a header or beacon containing at least a first training sequence. Each frame including a preamble may contain at least a second training sequence.

The data device further comprises processing means including coarse synchronization means for performing upon reception of each super-frame structure, a coarse synchronization with another independent data device acting as a coordinator device of the system. The coarse synchronization uses the first training sequence. Channel estimation means perform, upon reception of each frame allocated to the independent data device within the super-frame structure, a step of channel estimation using the second training sequence. This is based on at least one signal slice having ends temporally defined with respect to the result of the coarse synchronization for recovering all the channel energy. The channel estimation means are adapted to perform simultaneously the channel estimation and frame synchronization.

According to an embodiment of the present invention wherein the channel has a predetermined maximum length and the beacon further contains a time of arrival indication for each frame, the coarse synchronization means deliver a first delay information corresponding to the delay between the received incident signal and the transmitted signal. Channel estimation means are adapted to begin the step of channel estimation at a starting instant equal to the time of arrival of the frame increased with the difference between the first delay information and a predetermined offset on a signal slice having a size equal to the maximum channel length increased with the predetermined offset.

When the channel is a multipath channel, the predetermined offset may comprise a first offset taking into account the fact that the first delay information is associated with a path of the channel that can be different from the first path. The predetermined offset may also comprise a second offset taking into account the differences between the propagation delays between the coordinator and an independent data device, and between a pair of independent data devices. The second offset depends, for example, on the maximum distance between two independent data devices of the system.

According to another embodiment of the present invention, the coarse synchronization means and/or the channel estimation means comprise digital correlation means. For example, when the second training sequence is a dedicated pulse train having a pulse repetition period, the correlation means preferably comprise coherent integration means for performing during the channel estimation step. Coherent integration of successive signal slices have the same size and are mutually temporally shifted with the pulse repetition period.

BRIEF DESCRIPTION OF THE DRAWINGS

Other advantages and features of the present invention will appear on examining the detailed description of embodiments, which are in no way limiting, and of the appended drawings in which.

DETAILED DESCRIPTION OF THE PREFERRED EMBODIMENTS

Figure 1:
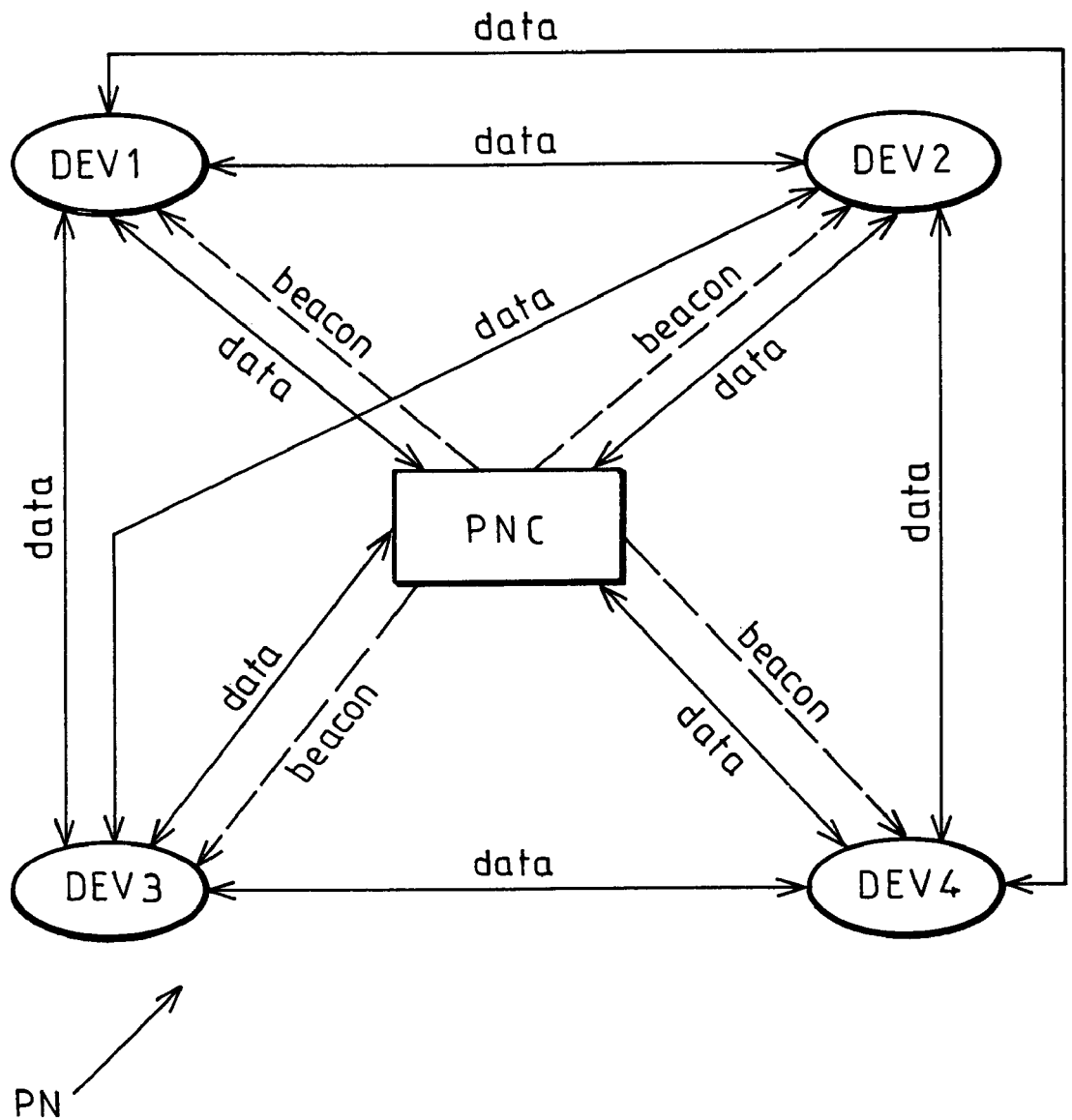
FIG. 1 shows diagrammatically an architecture of a wireless personal area network according to the present invention.

FIG. 1 shows a wireless communication system PN, such as a wireless personal area network. This type of wireless communication system network is called a piconet, which allows a number of independent data devices DEVi to communicate with each other.

A piconet is distinguished from other types of data networks in that communications are normally confined to a person or object that typically covers about 10 meters in all directions, and envelops the person or object whether stationary or in motion.

A piconet is in contrast to a local area network (LAN), a metropolitan area network (MAN), and a wide area network (WAN) which cover a larger geographic area, such as a single building or a campus or that would interconnect facilities in different parts of a country or of the world.

The basic component of a piconet is a data independent device DEV. Such an independent data device may be, for example, a personal computer or the like. One independent data device DEV is required to assume the role of the piconet coordinator PNC.

The coordinator PNC provides the basic timing for the piconet using a "beacon" which is part of a super-frame structure as will be explained in greater detail below. The PNC can communicate with the independent data devices DEVi. Further, two independent data devices can communicate with each other.

Figure 2:
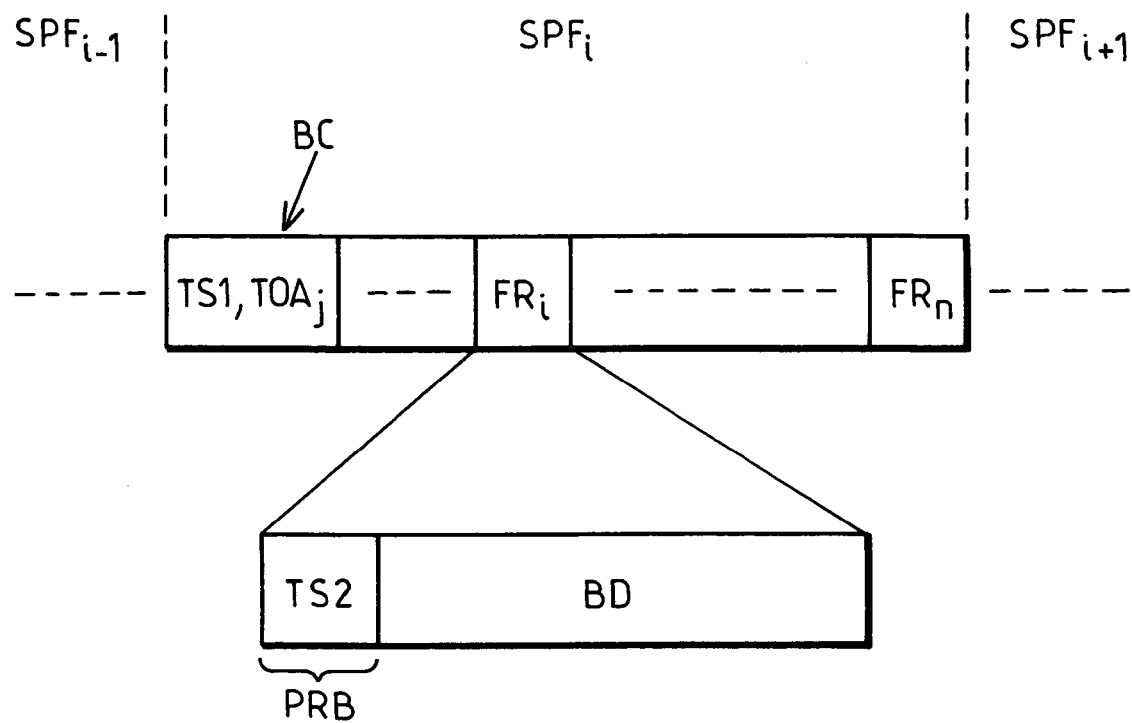
FIG. 2 shows diagrammatically a super-frame structure according to the present invention.

FIG. 2 depicts a super-frame structure used in the present invention for communication between the coordinator PNC and the data devices DEV, as well as for communication between two independent data devices. The incident signal received from a channel by an independent data device DEV carries information within a super-frame structure.

Each super-frame structure SPFI includes several frames $FR_i$ respectively allocated to communications between specific pairs of independent data devices DEV. Further, each super-frame structure includes a header, also called a beacon BC. The beacon BC contains at least a first training sequence TS1 as well as a time of arrival indication $TOA_j$ for each frame $FR_j$. Further, each frame $FR_i$ includes a preamble PRB containing at least a second training sequence TS2, and a body part BD containing the useful data.

Figure 3:
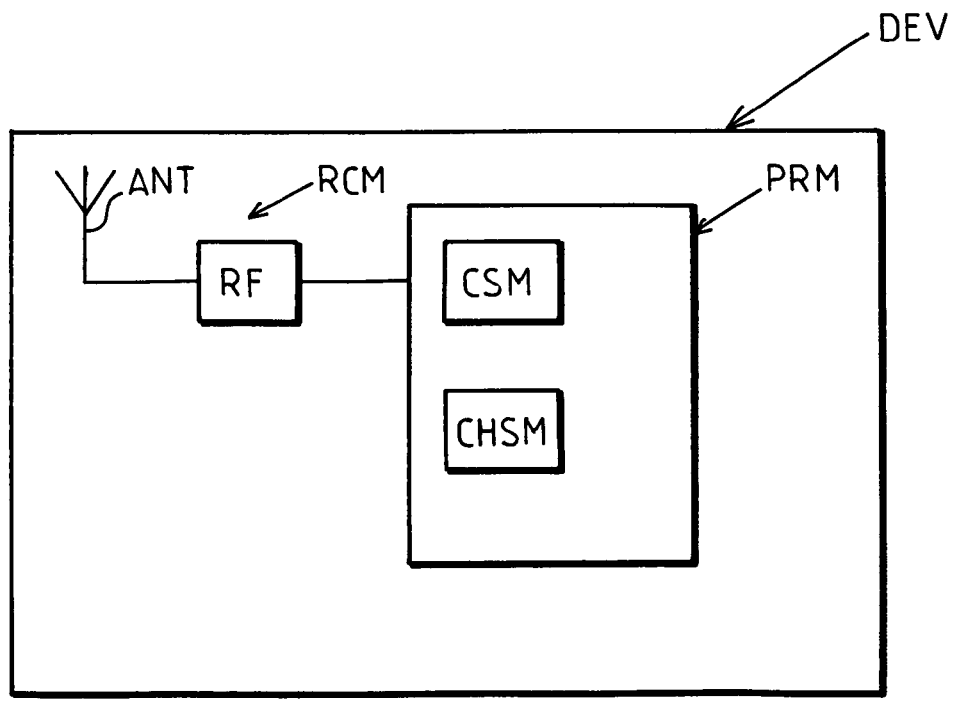
FIG. 3 shows diagrammatically an internal architecture of an independent data device according to the present invention.

As illustrated in FIG. 3, an independent data device DEV comprises reception means RCM followed by processing means PRM. More precisely, reception means RCM comprise an antenna ANT followed by a conventional frontend radio frequency stage. The processing means PRM, for example formed by software within a processor, comprises coarse synchronization means CSM and channel estimation means CHSM.

When an independent data device DEV is turned on, it will first search for an existing piconet in its neighborhood, and then synchronize with its coordinator PNC. This operation is referred to as cell synchronization, or DEV-to-PNC synchronization. The cell synchronization operation can be subdivided into three distinct phases: the coarse synchronization (step 40 in FIG. 4); the fine synchronization; and the clock synchronization.

During the coarse synchronization, the independent data device DEV is looking for the training sequence TS1 sent by the coordinator PNC. This coarse synchronization is further divided in two subphases: the detection of the training sequence, and the alignment to the coordinator's super frame. The goal of the detection subphase is to correlate the sent sequence with a known sequence (among N possible sequences, for example). The training sequence, which is a multiple repetition of a smaller sequence, is contained in the beacon, for example.

The coarse synchronization 40 provides a first delay information Ts corresponding to the delay between the received incident signal and the transmitted signal. The coarse synchronization can be made by using digital correlation, such as digital sliding correlation, for example. Digital sliding correlation is well known by those skilled in the art. The output of the correlation is then compared with a threshold, which typically has a large value for avoiding false detection while detecting a peak of the signal.

The sliding correlation can also comprise coherent integrations, which are also well known by those skilled in the art. These coherent integrations use a window of samples, with the length thereof being the size of the signal slice considered during coherent integrations. This window length corresponds, for example, to the size of a buffer needed in a hardware implementation.

The first delay information Ts represents the offset between the absolute reference of the system (initial position of the buffer) and the position of a peak detected by the coarse synchronization. The alignment to the coordinator superframe structure includes finding the end of the training sequence and correcting the eventual offset between the coordinator's clock reference and the clock reference in the independent data device.

During the fine synchronization, the independent data device synchronizes precisely to the beginning of the beacon body which contains, for example, the different indications $TOA_j$ to be sent by the coordinator to all the independent data devices DEV of the piconet. The clock synchronization includes identifying an eventual drift between the coordinator's clock and the independent data device's clock.

Assuming now that an independent data device DEV2 will communicate with another independent data device DEV1, the coordinator PNC will send out information about the allocation of the different time slots (frames) of the superframe structure. This information $TOA_j$ is contained, for example, in the beacon body. The independent data device DEV1 will hear that it will receive information from independent data device DEV2 during, for example, frame FR3, and that the training sequence sent by independent data device DEV2 in the frame preamble will be TS2.

The independent data device DEV1 can go to sleep until this frame FR3, and then wake up. At this instant, a frame synchronization is required from independent data device DEV1. In other words, the independent data device DEV1 has to synchronize with the independent data device DEV2 since it will have to listen to it.

Once the clock signal of independent data device DEV1 is synchronized to the clock signal of independent data device DEV2, which occurs at the end of the preamble PRB of frame FR3, the independent data device DEV1 can start to demodulate the data contained in the frame sent by the independent data device DEV2. In addition to the frame synchronization performed on the frame level, channel estimation is also necessary to evaluate the channel response template and to determine the coefficients of the impulse response of the channel.

According to the invention, both frame synchronization and channel estimation are made simultaneously on a frame level, and more precisely, at the beginning of the frame, by using the same training sequence TS2 sent by an independent data device. In the present case, this device may be independent data device DEV2 which communicates with independent data device DEV1.

Both channel estimation and frame synchronization 43 (FIG. 4) are made by a channel estimation algorithm CHSM implemented in the processor PRM. More precisely, in the present example, the channel estimation means CHSM comprise coherent integration means CHIM (FIG. 6) which perform digital coherent integration. The training sequence TS2 used by the channel estimation means CHSM is a dedicated UWB pulse train having a pulse repetition period PRP equal to 20 ns, for example.

Figure 6:
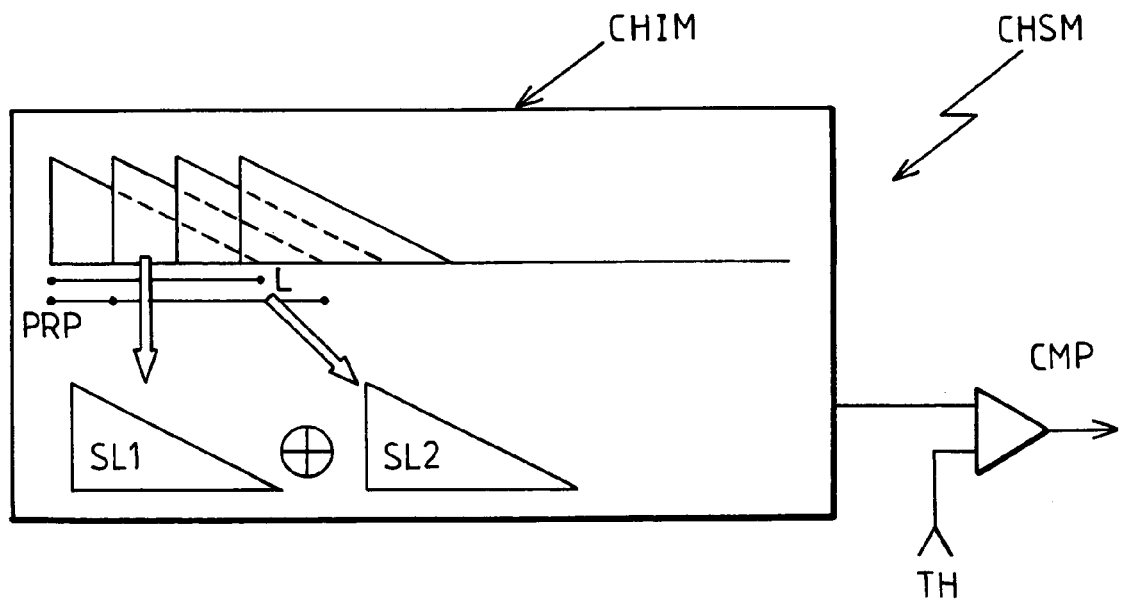
FIG. 6 shows diagrammatically an example of coherent integration used during channel estimation according to the present invention.

As diagrammatically illustrated in FIG. 6, the coherent integration means CHIM are adapted to sum N times, slices $SI_i$ of the received signal. Each slice has a length L and two successive slices are mutually shifted by the PRP period. The length of the training sequence is equal to N×PRP. The number N of coherent integrations has to be the smallest while permitting good performances to still be obtained. A value around 64 is an optimum value, for example.

Although it is possible to use as a training sequence successive UWB pulses respectively located at the same position within successive pulse repetition periods, the training sequence can be coded to avoid the spectral spikes and to minimize the effect of the interferences from other piconets. For example, a well known time hopping code can increase the performances of the system without increasing the complexity. As also well known by those skilled in the art, when using time hopping, the positions of the successive pulses of the training sequence within the successive pulse repetition periods are different. One can also note that it is not necessary to use pulse position modulation for a training sequence since no useful logic data is transmitted within this training sequence. Of course, when a time hopping code is used, it must be taken into consideration in the coherent integration before adding the successive signal slices.

After eventually obtaining power optimization, the result of the coherent integration is compared with a predetermined threshold TH in the comparison means CMP to cancel any noise. The output of the comparator means CMP gives the result of the channel estimation as well as the frame synchronization. However, to recover all the channel energy, and thereby perform a fine frame synchronization, the ends of the signal slices have to be properly defined.

The coarse synchronization performed at the beginning of the super-frame structure provides the first delay information Ts. This first delay information Ts together with the time of arrival indication $TOA_i$ of the frame $FR_i$ gives a first information about this frame synchronization.

Figure 5:
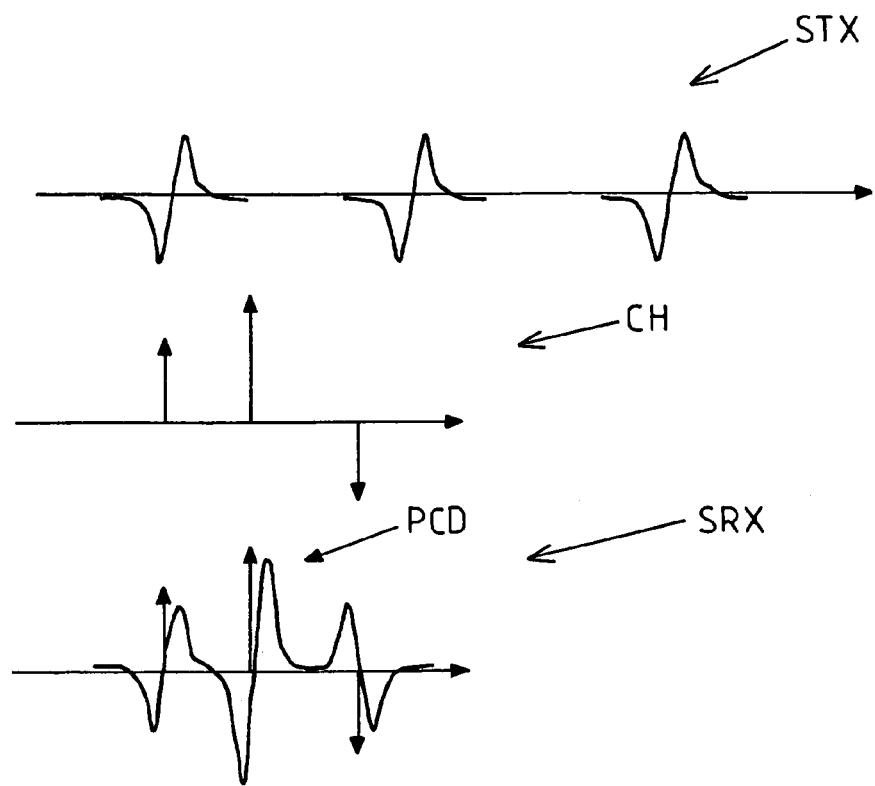
FIG. 5 shows diagrammatically an example of a received signal resulting from the transmission of a training sequence during the coarse synchronization according to the present invention.

As mentioned before, Ts represents the offset between the absolute reference of the system (initial position of the buffer) and the position of the peak detected by coarse synchronization. Nevertheless, it is possible that the detected peak is not the first peak of the received channel response. This is illustrated in FIG. 5, for example.

In this figure, the channel CH is assumed to be a multipath channel having three paths. STX refers to the transmitted signal whereas SRX refers to the received signal. For example, the peak PCD of the received signal SRX, which is detected during the coarse synchronization, can be the second peak corresponding to the second path of the channel.

Figure 4:
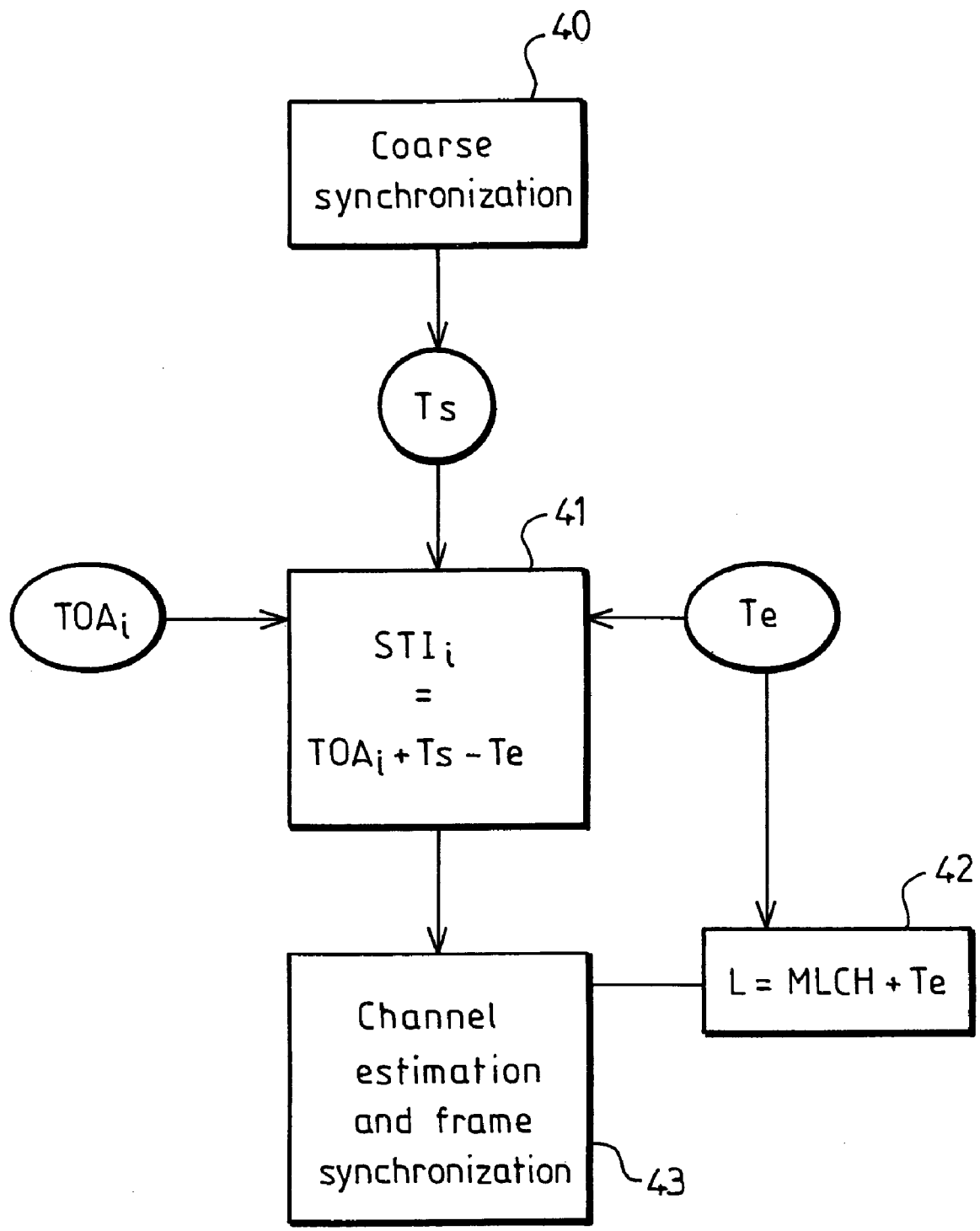
FIG. 4 shows diagrammatically an embodiment of a method according to the present invention.

Thus, for recovering all the channel energy, step 43 of the channel estimation process begins on a signal slice starting at an instant $STI_i$ equal to the time of arrival $TOA_i$ of the frame $_{FRi}$ increased with the difference (Ts-Te) between the first delay information Ts and a predetermined offset Te (step 41, FIG. 4).

More precisely, the predetermined offset Te is the sum of a first offset and a second offset. The first offset takes into account the fact that the first delay information Ts is associated with a path of the channel which can be different from the first path. Statistical results indicate that the value of this first offset to 10 ns. This means that the position of the detected peak during the coarse synchronization is always within the first 10 ns of the channel response.

The second offset takes into account the differences between the propagation delays. Actually, during the coarse synchronization, all devices perform the synchronization with the coordinator PNC, which is the device sending the beacon. However, on the frame level, each frame is dedicated to a communication between a specific pair of devices, and the propagation delay between these two devices is normally different from the delay propagation between the coordinator and the considered device.

The maximum differences between the propagation delays depend on the maximum distance between independent data devices. For example, a 1 meter distance corresponds to 3 ns of propagation delay. In a WPAN UWB system of the piconet type, the maximum distance considered is 10 meters, for example, so that the second offset can be equal to about 30 ns. Consequently, an acceptable value or the predetermined offset Te is about 40 ns.

Another parameter allowing recovery of all the channel energy is the window length, i.e., the size of each signal slice. More precisely, this length L can be equal to the sum of the predetermined offset Te and the maximum channel length MLCH, which can be assumed to be equal to 50 ns, for example. Accordingly, using a window length of L, placed first at the starting instant $STI_i$, allows the channel estimation algorithm to also perform a frame synchronization. Consequently, it is not necessary to embody a specific synchronization algorithm.

That which is claimed is:

1. A method for processing an incident pulsed signal of an ultra wide band type received over a channel by a data device operating in a wireless data communications system, the incident pulsed signal carrying information within a super-frame structure, each super-frame structure comprising a plurality of frames respectively allocated for communications between specific pairs of data devices operating in the wireless data communications system and a header including at least one first training sequence, each frame comprising a preamble including at least one second training sequence, the method comprising:

upon reception of each super-frame structure by a data device, performing coarse synchronization with another data device acting as a coordinator device for the wireless data communications system, the coarse synchronization using the first training sequence; and upon reception of each frame allocated to the data device operating within the super-frame structure, performing channel estimation using the second training sequence, the channel estimation being based on at least one signal slice having ends temporally defined with respect to a result of the coarse synchronization, the channel estimation also performing a frame synchronization.

2. A method according to claim 1, wherein the channel has a predetermined maximum length; wherein the header further includes a time of arrival indication for each frame; wherein the coarse synchronization delivers a first delay information corresponding to a delay associated with the received incident pulsed signal; and wherein the channel estimation begins on a signal slice starting at an instant equal to the time of arrival of the frame increased by a difference between the first delay information and a predetermined offset, the signal slice having a size equal to a maximum channel length increased by the predetermined offset.

3. A method according to claim 2, wherein the channel comprises a multipath channel; and wherein the predetermined offset comprises a first offset taking into account that the first delay information is associated with a different path of the channel.

4. A method according to claim 3, wherein the first offset is equal to about 10 ns.

5. A method according to claim 3, wherein the predetermined offset comprises a second offset taking into account differences between propagation delays between the coordinator device and a data device, and between a pair of data devices.

6. A method according to claim 5, wherein the second offset depends on a maximum distance between two data devices.

7. A method according to claim 5, wherein the second offset is equal to about 30 ns.

8. A method according to claim 5, wherein the predetermined offset is a sum of the first and second offsets.

9. A method according to claim 1, wherein the first training sequence is identical to the second training sequence.

10. A method according to claims 1, wherein at least one of performing the coarse synchronization and the channel estimation comprises performing a digital correlation.

11. A method according to claim 10, wherein the second training sequence is a dedicated pulse train having a pulse repetition period; and wherein the digital correlation performed during the channel estimation comprises coherent integration of successive signal slices having a same size and being mutually temporally shifted with the pulse repetition period.

12. A method according to claim 1, wherein the wireless data communication system comprises a wireless personal area network of the piconet type.

13. A data device of a wireless data communications system comprising:
  a receiver for receiving an incident pulsed signal of an ultra wide band type over a channel, the incident pulsed signal carrying information within a super-frame structure, each super-frame structure comprising a plurality of frames respectively allocated to communications between specific pairs of data devices operating in the wireless data communications system and a header including at least one first training sequence, each frame comprising a preamble including at least one second training sequence; and
  a processor connected to said receiver and comprising
    a coarse synchronizer for performing, upon reception of each super-frame structure, a coarse synchronization with another data device acting as a coordinator device of the wireless data communications system, said coarse synchronizer using the first training sequence, and
    a channel estimator for performing, upon reception of each frame allocated to the data device within the super-frame structure, channel estimation using the second training sequence, the channel estimation being based on at least one signal slice having ends temporally defined with respect to a result of the coarse synchronization, said channel estimator also performing a frame synchronization.

14. A data device according to claim 13, wherein the channel has a predetermined maximum length; wherein the header further includes a time of arrival indication for each frame; wherein said coarse synchronizer delivers a first delay information corresponding to a delay associated with the received incident pulsed signal; and wherein said channel estimator begins the channel estimation on a signal slice starting at an instant equal to the time of arrival of the frame increased by a difference between the first delay information and a predetermined offset, the signal slice having a size equal to a maximum channel length increased by the predetermined offset.

15. A data device according to claim 14, wherein the channel comprises a multipath channel; and wherein the predetermined offset comprises a first offset taking into account that the first delay information is associated with a different path of the channel.

16. A data device according to claim 15, wherein the first offset is equal to about 10 ns.

17. A data device according to claim 15, wherein the predetermined offset comprises a second offset taking into account differences between propagation delays between the coordinator device and a data device, and between a pair of data devices.

18. A data device according to claim 17, wherein said second offset depends on a maximum distance between two data devices.

19. A data device according to claim 17, wherein the second offset is equal to about 30 ns.

20. A data device according to claim 17, wherein the predetermined offset is a sum of the first and second offsets.

21. A data device according to claim 13, wherein the first training sequence is identical to the second training sequence.

22. A data device according to claim 13, wherein at least one of said coarse synchronizer and said channel estimator comprise a digital correlator.

23. A data device according to claim 22, wherein the second training sequence is a dedicated pulse train having a pulse repetition period; and wherein said digital correlator comprises a coherent integrator for performing during the channel estimation a coherent integration of successive signal slices having a same size and being mutually temporally shifted with the pulse repetition period.

24. A data device according to claim 13, wherein the wireless data communication system comprises a wireless personal area network of the piconet type.

25. A wireless data communications system comprising:
  a plurality of data devices, each data device comprising
  a receiver for receiving an incident pulsed signal of an ultra wide band type over a channel, the incident pulsed signal carrying information within a super-frame structure, each super-frame structure comprising a plurality of frames respectively allocated to communications between specific pairs of data devices operating in the wireless data communications system and a header including at least one first training sequence, each frame comprising a preamble including at least one second training sequence, and
  a processor connected to said receiver and comprising
    a coarse synchronizer for performing, upon reception of each super-frame structure, a coarse synchronization with another data device acting as a coordinator device of the wireless data communications system, said coarse synchronizer using the first training sequence, and
    a channel estimator for performing, upon reception of each frame allocated to the data device within the super-frame structure, channel estimation using the second training sequence, the channel estimation being based on at least one signal slice having ends temporally defined with respect to a result of the coarse synchronization, said channel estimator also performing a frame synchronization.

26. A wireless data communications system according to claim 25, wherein the channel has a predetermined maximum length; wherein the header further includes a time of arrival indication for each frame; wherein said coarse synchronizer delivers a first delay information corresponding to a delay associated with the received incident pulsed signal; and wherein said channel estimator begins the channel estimation on a signal slice starting at an instant equal to the time of arrival of the frame increased by a difference between the first delay information and a predetermined offset, the signal slice having a size equal to a maximum channel length increased by the predetermined offset.

27. A wireless data communications system according to claim 26, wherein the channel comprises a multipath channel; and wherein the predetermined offset comprises a first offset taking into account that the first delay information is associated with a different path of the channel.

28. A wireless data communications system according to claim 27, wherein the first offset is equal to about 10 ns.

29. A wireless data communications system according to claim 27, wherein the predetermined offset comprises a second offset taking into account differences between propagation delays between the coordinator device and a data device, and between a pair of data devices.

30. A wireless data communications system according to claim 29, wherein said second offset depends on the maximum distance between two data devices.

31. A wireless data communications system according to claim 29, wherein the second offset is equal to about 30 ns.

32. A wireless data communications system according to claim 29, wherein the predetermined offset is a sum of the first and second offsets.

33. A wireless data communications system according to claim 25, wherein the first training sequence is identical to the second training sequence.

34. A wireless data communications system according to claim 25, wherein at least one of said coarse synchronizer and said channel estimator comprises a digital correlator.

35. A wireless data communications system according to claim 34, wherein the second training sequence is a dedicated pulse train having a pulse repetition period; and wherein said digital correlator comprises a coherent integrator for performing during the channel estimation a coherent integration of successive signal slices having a same size and being mutually temporally shifted with the pulse repetition period.

36. A wireless data communications system according to claim 25, wherein the wireless data communication system comprises a wireless personal area network of the piconet type.

* * * * *

UNITED STATES PATENT AND TRADEMARK OFFICE
CERTIFICATE OF CORRECTION

PATENT NO. : 7,542,486 B2  Page 1 of 1
APPLICATION NO. : 10/792032
DATED : June 2, 2009
INVENTOR(S) : Chiara Cattaneo It is certified that error appears in the above-identified patent and that said Letters Patent is hereby corrected as shown below:

Column 2, Line 2        Delete: "networks"
                        Insert: -- network --

Column 2, Line 10       Delete: "includes"
                        Insert: -- including --

Column 2, Line 16       Delete: "comprises"
                        Insert: -- comprise --

Column 5, Line 26       Delete: "SPFI"
                        Insert: -- $SPF_i$ --

Claim 10, Column 9, Line 13   Delete: "claims"
                              Insert: -- claim --

Signed and Sealed this

Twenty-ninth Day of September, 2009

David J. Kappos
*Director of the United States Patent and Trademark Office*